US012596332B2

(12) United States Patent
    Kyung

(10) Patent No.:    US 12,596,332 B2
(45) Date of Patent:        Apr. 7, 2026

(54) METHOD AND APPARATUS FOR PROVIDING WATCH FACE USING NFC TAGGING

(71) Applicant: APPOSTER INC., Seoul (KR)

(72) Inventor: Sung Hyun Kyung, Gimpo-Si (KR)

(73) Assignee: APPOSTER INC., Seoul (KR)

( * ) Notice:    Subject to any disclaimer, the term of this patent is extended or adjusted under 35 U.S.C. 154(b) by 323 days.

(21) Appl. No.: 18/516,968

(22) Filed:    Nov. 22, 2023

(65)    Prior Publication Data

US 2025/0068128 A1    Feb. 27, 2025

(30)    Foreign Application Priority Data

Aug. 22, 2023    (KR) ........................ 10-2023-0110089

(51) Int. Cl.
    *G04B 45/00*        (2006.01)
    *A44C 5/12*        (2006.01)
    *H04L 67/306*        (2022.01)
    *H04W 4/80*        (2018.01)
(52) U.S. Cl.
    CPC ................ *G04B 45/00* (2013.01); *A44C 5/12* (2013.01); *H04L 67/306* (2013.01); *H04W 4/80* (2018.02)
(58) Field of Classification Search
    None
    See application file for complete search history.

(56)    References Cited

U.S. PATENT DOCUMENTS

| | | | | |
|---|---|---|---|---|
| 10,775,846 | B2 * | 9/2020 | Meen | G04G 21/02 |
| 11,048,212 | B2 * | 6/2021 | Qian | G06F 3/147 |
| 2021/0397139 | A1 * | 12/2021 | D'Auria | G06F 3/1454 |

FOREIGN PATENT DOCUMENTS

KR        101620368 B1 *    5/2016

OTHER PUBLICATIONS

KIPRIS machine translation of KR 101620368. (Year: 2025).*

* cited by examiner

*Primary Examiner* — Regis J Betsch
*Assistant Examiner* — Michael James Walker
(74) *Attorney, Agent, or Firm* — Osha Bergman Watanabe & Burton LLP

(57)    ABSTRACT

A method and apparatus for providing a watch face using NFC tagging performed by at least one server includes obtaining watch face request information from a user terminal based on uniform resource locator (URL) information corresponding to a strap; and providing information about a watch face matching the strap based on the URL information to the user terminal. The URL information is obtained from a Near Field Communication (NFC) tag mounted on the strap via an NFC reader installed in the user terminal.

12 Claims, 9 Drawing Sheets

METHOD AND APPARATUS FOR PROVIDING WATCH FACE USING NFC TAGGING

CROSS-REFERENCE TO RELATED APPLICATION

This application is based on and claims priority under 35 U.S.C. 119 to Korean Patent Application No. 10-2023-0110089, filed on Aug. 22, 2023 in the Korean Intellectual Property Office, the disclosure of which is herein incorporated by reference by reference for all purposes.

BACKGROUND

1. Field

The following description relates to a method and apparatus for providing a watch face using Near Field Communication (NFC) tagging, and in particular to a method and apparatus for providing a watch face for a wearable device based on information obtained through NFC tagging between user terminals and wearable devices.

2. Description of Related Art

With the continuous development of intelligent wearable devices, smartwatches are becoming popular, and the number of consumers wearing smartwatches in their daily lives is gradually increasing. These consumers are wearing smartwatches for various purposes such as fashion, business, health, and sports. In response to this growing demand, smartwatches in various styles are being sequentially released.

The watch face of a smartwatch is displayed electronically, so the screen of a smartwatch can be freely customized in contrast to analog watches, allowing for changes in the watch's design. In other words, a smartwatch allows users to manually change the display format of the watch face. Users can freely modify the content displayed on the watch face, which corresponds to the display portion of the smartwatch, to suit their mood, condition, style, etc.

Furthermore, a smartwatch typically consists of a watch body with a display module and a strap for attaching the watch body to a user's wrist. The strap is usually detachable, allowing the user to choose a style of strap that suits their attire and location when wearing the smartwatch.

The strap's style should harmonize the watch face displayed on the watch body's display module for a unified smartwatch appearance. However, it can be inconvenient for users when they changing the strap, as it may necessitate reconfiguring or altering the smartwatch's watch face each time.

SUMMARY

The purpose of this disclosure is to introduce a method and apparatus for providing a watch face using NFC tagging to address the above issues.

The purpose of this disclosure is to introduce a method and apparatus for providing a watch face that matches a strap based on information obtained using NFC tagging.

The purpose of this disclosure is to introduce a method and apparatus for providing a watch face only to the owner of a strap based on the unique identification information of the strap.

The issues to be solved by the present disclosure is not limited to the above-mentioned issues, and the issues not mentioned can be clearly understood by those having ordinary skill in the art to which the present disclosure belongs from the present disclosure and the accompanying drawings.

In one general aspect, a method for providing a watch face performed by at least one server includes obtaining watch face request information from a user terminal based on uniform resource locator (URL) information corresponding to a strap; and providing information about a watch face matching the strap based on the URL information to the user terminal. The URL information is obtained from a Near Field Communication (NFC) tag mounted on the strap via an NFC reader installed in the user terminal. The information about a watch face includes setting information for representing the watch face on a display of a wearable device that can be connected to the strap. The wearable device is paired in advance with the user terminal.

The method may further include obtaining unique identification information of the strap from the user terminal. The unique identification information may be obtained from the NFC tag mounted on the strap via the NFC reader installed in the user terminal. The providing information about a watch face matching the strap based on the URL information to the user terminal may include activating a website corresponding to the URL information based on the unique identification information. The user terminal may obtain information about a watch face that matches the strap via the website.

The URL information and the unique identification information may be included in different payload fields within tag information obtained from the NFC tag.

The activating a website corresponding to the URL information based on the unique identification information may include: obtaining an activation code corresponding to the URL information from a database of the server; and activating a website corresponding to the URL information based on the activation code and the unique identification information.

The activating a website corresponding to the URL information based on the activation code and the identification information may include: determining one of a plurality of individual URL information by comparing the activation code and the unique identification information; and providing the determined one URL information to the user terminal. The website is provided based on the individual URL information.

The method may further include obtaining user information including a user identification number from the user terminal; registering owner information 3 on the strap based on the user information and the unique identification information; obtaining, after the information about a watch face is provided to the user terminal, when the watch face request information is obtained again from another user terminal, the owner information based on the identification information; obtaining a first identification number from the another user terminal; and activating a website corresponding to the URL information based on the first identification number and the user identification number.

In another general aspect, an electronic device performing the method for providing a watch face includes at least one processor and a memory for storing at least one command executed by the at least one processor. At least one command is executed to obtain watch face request information based on URL information corresponding to the strap from a user terminal and to provide information about the watch face matching the strap based on the URL information to the user terminal. The URL information is obtained from the NFC tag mounted on the strap through the NFC reader installed in the user terminal. The information about the watch face includes setting information representing the watch face on the display of a wearable device connectable to the strap. The wearable device is paired in advance with the user terminal.

The at least one command may be executed to obtain the unique identification information of the strap from the user terminal. The unique identification information may be obtained from the NFC tag mounted on the strap through the NFC reader installed in the user terminal. The at least one command may be executed to activate a website corresponding to the URL information based on the unique identification information. The user terminal may obtain information about the watch face matching the strap through the website.

The URL information and the unique information may be included in different payload fields within the tag information obtained from the NFC tag.

The at least one command may be executed to obtain an activation code corresponding to the URL information from the database of the electronic device. The activation code and the unique identification information may be used to activate the website corresponding to the URL information.

The at least one command may be executed to compare the activation code and the unique identification information to determine one of a plurality of individual URL information. The determined individual URL information may be provided to the user terminal, and the website may be provided based on the individual URL information.

The at least one command may be executed to: obtain user information, including a user identification number, from the user terminal; register owner information for the strap based on the user information and the unique identification information; obtain the owner information after information about the watch face has been provided to the user terminal, if the watch face request information is obtained again from another user terminal; obtain a first identification number from the another user terminal; and activate a website corresponding to the URL information based on the first identification number and the user identification number.

Various aspects and features of the present disclosure described above as a means of solving the issue may be defined in the appended claims. Combinations of the features of the dependent claims may be combined with the features of the independent claims as appropriate, not only with the features expressly set forth in the claims.

In addition, one or more features selected from any examples described in this disclosure may be combined with one or more features selected from any other examples described in this disclosure. Alternative combinations of these features may at least partially alleviate one or more technical issues discussed in this disclosure, or at least partially alleviate technical issues discernable by one skilled in the art from this disclosure. Moreover, specific combinations or permutations of embodiment features formed in this manner should not be considered impossible unless they are deemed incompatible by those skilled in the art.

In any described example implementation in this disclosure, two or more physically distinct components may alternatively be integrated into a single component if such integration is feasible, and if the same function can be performed by the resulting single component, such integration is feasible. Conversely, in any embodiment described in this disclosure, a single component may alternatively be implemented by two or more distinct components when appropriate to achieve the same function.

The objective of certain examples of the present disclosure is to at least partially address, alleviate, or eliminate one or more of the issues and/or disadvantages associated with the prior art. Certain examples are aimed at providing at least one of the advantages mentioned herein.

According to this disclosure, it may allow for the easy acquisition of a watch face that matches a strap and configuring the obtained watch face on a smartwatch connected to the strap.

According to this disclosure, it may enable the provision of a watch face based on the unique identification information of a strap, ensuring that only the user who owns the strap receives the matching watch face.

The effects that can be obtained in this disclosure are not limited to the effects mentioned above, and other effects that are not mentioned can be clearly understood by those having ordinary skill in the art that this disclosure belongs from the following description.

DETAILED DESCRIPTION

Figure 1:
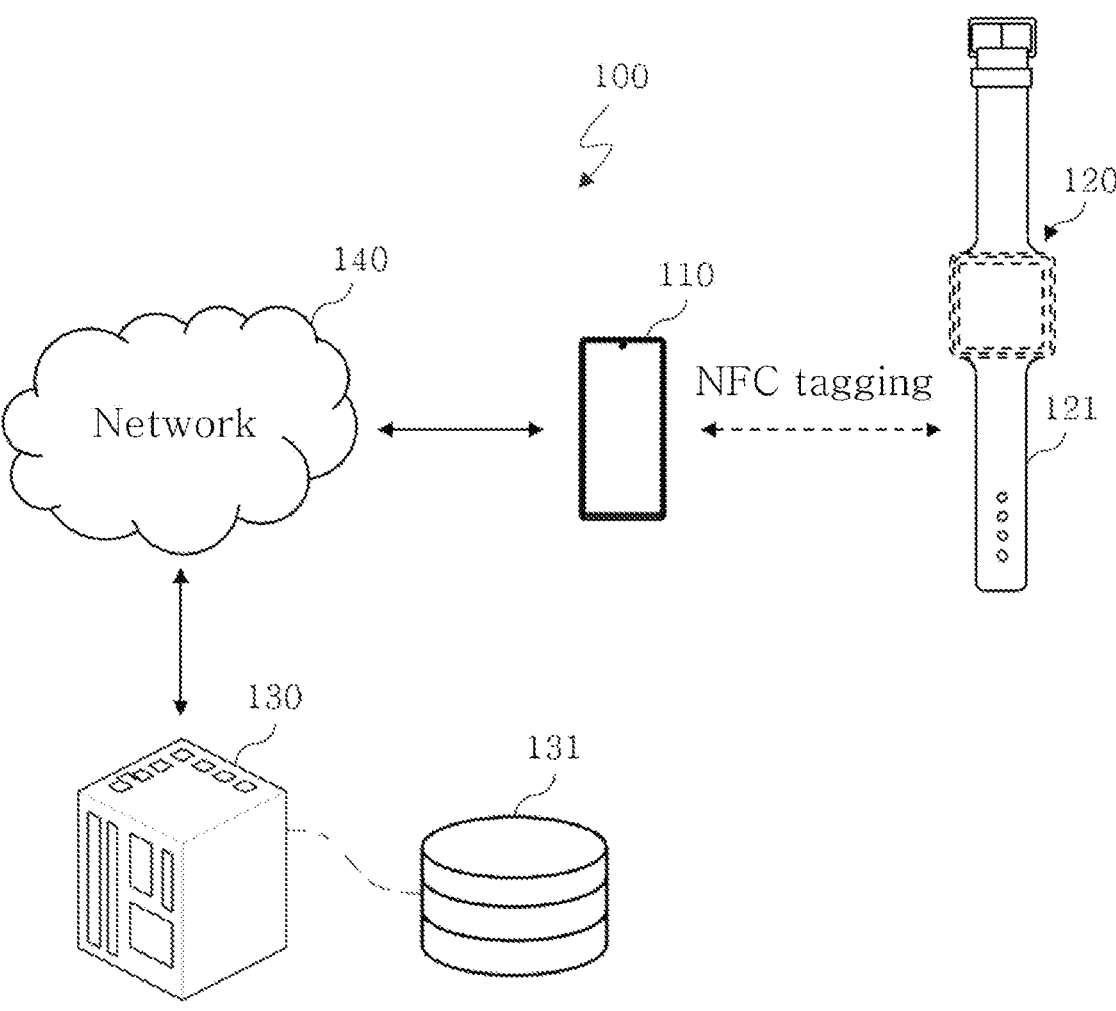
FIG. 1 illustrates a diagram of a watch face providing system using NFC tagging according to one or more examples of the present disclosure.

Since the present disclosure may make various changes and have various embodiments, specific embodiments will be illustrated in the drawings and described in detail in the Detailed Description. However, this is not intended to limit the present disclosure to specific embodiments, and should be understood to include all changes, equivalents, and substitutes included in the spirit and technical scope of the present disclosure. While describing each drawing, similar reference numerals are used for similar components.

Terms such as first, second, A, B, etc. may be used to describe various components, but the components should not be limited by the terms. The above terms are used only for the purpose of distinguishing one component from another. For example, a first component may be named a second component, and similarly, the second component may also be named a first component without departing from the scope of the present disclosure. The term "and/or" includes any of a plurality of related stated items or a combination of a plurality of related stated items.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein, including technical or scientific terms, have the same meaning as commonly understood by a person of ordinary skill in the technical field to which the present disclosure pertains. Terms defined in commonly used dictionaries should be interpreted as having a meaning consistent with the meaning in the context of the related technology, and unless explicitly defined in the present application, should not be interpreted in an ideal or excessively formal sense.

Hereinafter, preferred embodiments of the present disclosure will be described in more detail with reference to the attached drawings. In order to facilitate overall understanding when describing the present disclosure, the same reference numerals are used for the same components in the drawings, and duplicate descriptions for the same components are omitted.

FIG. 1 illustrates a diagram of a watch face providing system using NFC tagging according to one or more examples of the present disclosure.

Referring to FIG. 1, a watch face providing system 100 may refer to a system in which watch faces are provided using NFC tagging. In other words, the watch face providing system 100 may refer to a system where a user performs NFC tagging on a strap 121 connected to a wearable device 120 using a user terminal 110 and a system that provides information about the watch face to the user terminal 110 based on the information obtained via NFC tagging.

According to an example of the present disclosure, the watch face providing system 100 may include a user terminal 110, a wearable device 120, a strap 121, a watch face providing server 130, a database 131, and a network 140.

For example, the user terminal 110 may refer to devices such as a smartphone, mobile phone, navigation system, computer, laptop, digital broadcasting terminal, personal digital assistance (PDA), portable multimedia player (PMP), or tablet PC. However, it is not limited to thereto and may also include fixed or mobile devices implemented with computing devices.

The wearable device 120 may refer to a wearable computing device that a user can wear. For example, the wearable device 120 may be a smartwatch designed to be worn like a traditional watch, and the following description assumes it to be a smartwatch. However, it is not limited to thereto, and at least some of examples of the present disclosure may be applied to other wearable devices, such as eyeglasses.

Referring to FIG. 1, the components of the watch face providing system 100 may be connected through the network 140. According to an example of the present disclosure, the network 140 refers to a connectivity structure that enables information exchange between various nodes, such as a plurality of terminals and servers. As examples of the network, RF, $3^{rd}$ generation partnership project (3GPP) network, long term evolution (LTE) network, $5^{th}$ generation partnership project (5GPP) network, world interoperability for microwave access (WIMAX) network, Internet, Local Area Network (LAN), Wireless Local Area Network (Wireless LAN), Wide Area Network (WAN), Personal Area Network (PAN), Bluetooth Network, NFC network, satellite broadcast network, analog broadcast network, Digital Multimedia Broadcasting (DMB) network, etc., are included, but it is not limited thereto.

Hereafter, the specific configuration and operation of the watch face providing system 100 are described in detail.

Figure 2:
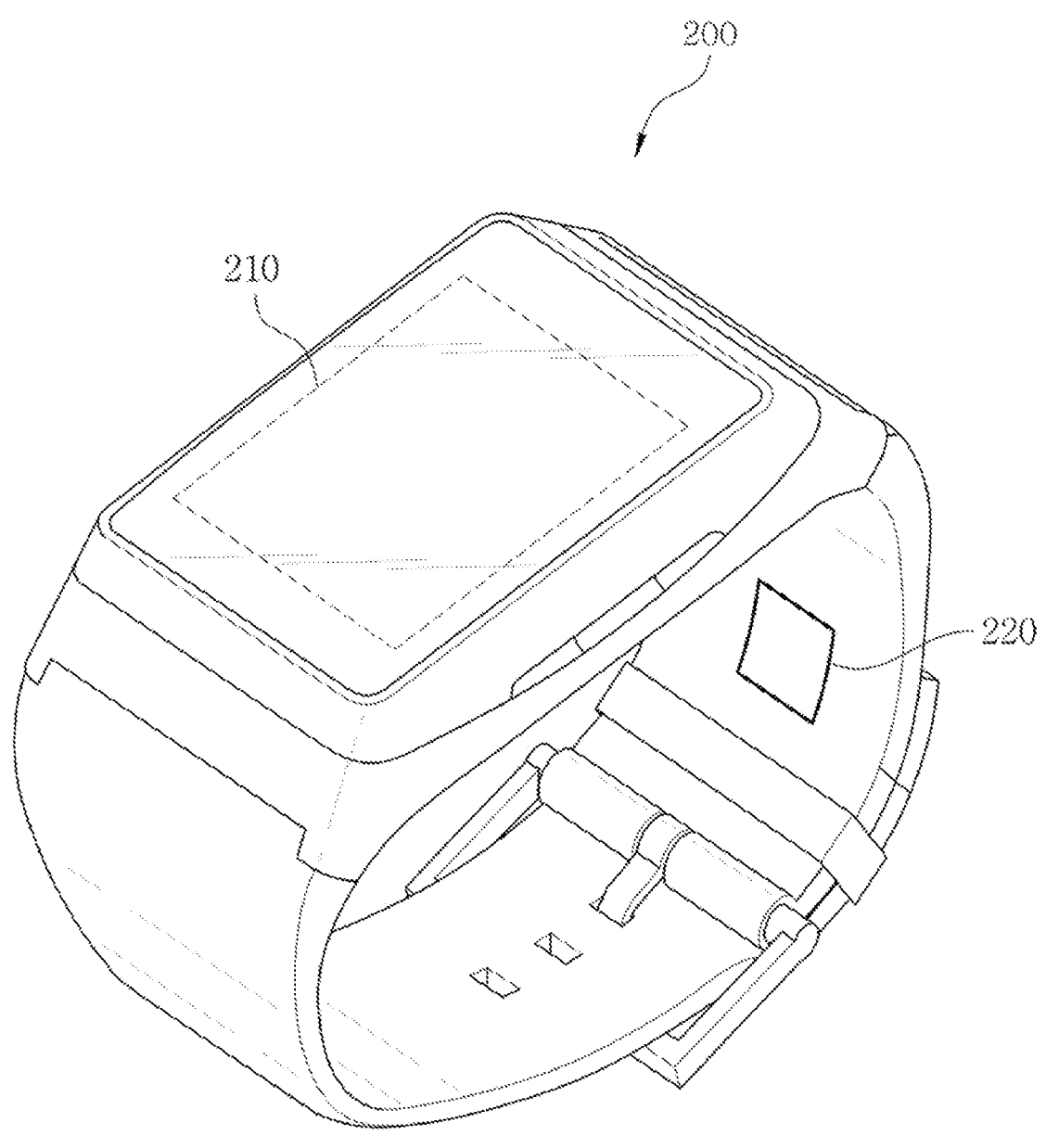
FIG. 2 illustrates a diagram of a wearable device where a watch face is configured according to one or more examples of the present disclosure.

FIG. 2 illustrates a diagram of a wearable device where a watch face is configured according to one or more examples of the present disclosure.

Referring to FIG. 2, a wearable device 120 may refer to a wearable computing device worn by a user. For the convenience of explanation, a smartwatch 200 worn on the wrist is provided as an example of the wearable device 120, but the wearable device 120 is not limited thereto. The wearable device 120 may include any wearable computing devices that include a display module 210 and an NFC module 220. According to an example of the present disclosure, the wearable device 120 may include a main body and a strap.

The main body may refer to the part of the smartwatch that performs its general functions. In other words, the main body may be connected to a user terminal and may perform various functions, such as displaying the time or monitoring the user's health status. In particular, the main body may include a display module 210 and may display the watch face user interface (UI) screen through the display module 210.

The strap may refer to a fixed device in the form of a strap that allows a user to wear the main body. The strap may be made from various materials, such as leather, stainless steel, silicone, rubber, denim, and synthetic fibers, and may have the function of fixing the main body to the user's wrist. The NFC module 220 may be embedded in at least one area of the strap.

The NFC module 220 may be attached to a portion of the strap that comes into contact with the user's wrist, or it may also be attached to a portion that does not come into contact with the user's wrist. In other words, the NFC module 220 may be attached to one side of the strap, or be integrated inside the strap, making it not visible from the outside.

For example, the NFC module 220 may include an NFC tag that stores preconfigured information. An NFC tag may provide preconfigured information to an electronic device with an NFC reader when the electronic device with an NFC reader approaches within a predetermined distance. This configuration or action of approaching within a predetermined distance is commonly referred to as "tagging."

For example, the preconfigured information may be referred to as NFC tag information and may include unique identification information of the strap with the embedded NFC tag and URL information that may be used to obtain a watch face that matches the strap. However, it may also include other information more. Here, an electronic device with an NFC reader may refer to the user terminal 110, which will be described below, but it is not limited thereto.

Figure 3:
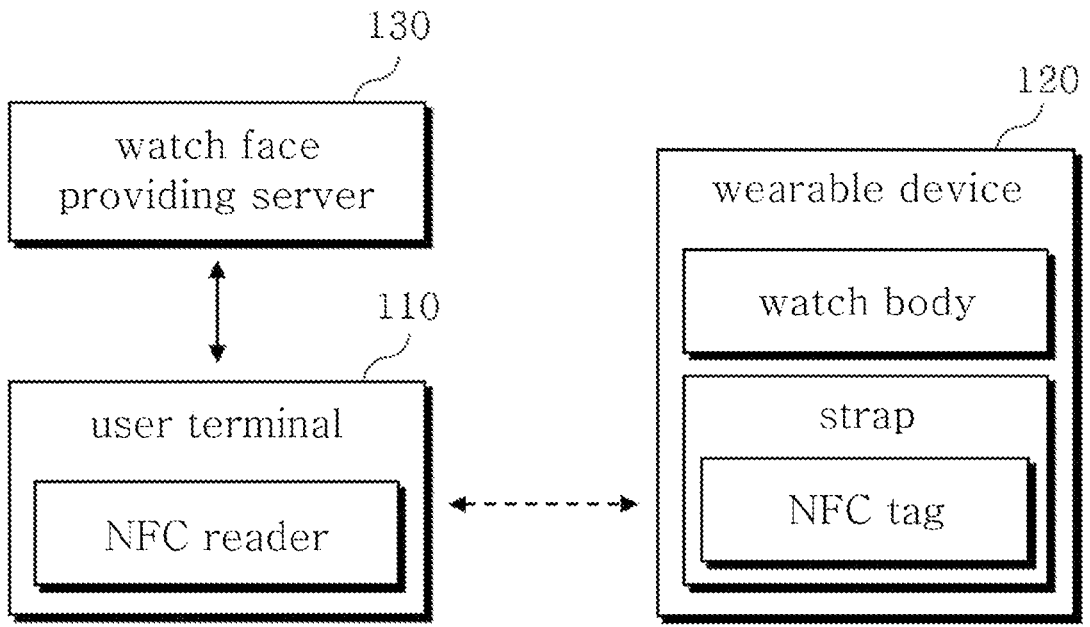
FIG. 3 illustrates a block diagram of terminals configuring a watch face providing system according to one or more examples of the present disclosure.

FIG. 3 illustrates a block diagram of terminals configuring a watch face providing system according to one or more examples of the present disclosure.

Referring to FIG. 3, a watch face providing system includes a user terminal 110, a wearable device 120, and a watch face providing server 130 as components, and a method for providing a watch face may be performed through the transmission and reception of information among these components. For example, the user terminal 110 and the watch face providing server 130 may perform the transmission and reception of information through wired or wireless communication, and the user terminal 110 and the wearable device 120 may perform the transmission and reception of information through NFC or wireless communication.

The user terminal 110 may include an NFC module, and the NFC module of the user terminal 110 may include an NFC reader. The NFC reader may tag an NFC tag to read the information stored or encoded in the NFC tag, and the user terminal 110 may obtain the preconfigured information, namely, the NFC tag information, from the NFC tag through the NFC reader.

The wearable device 120 may include a watch main body and a strap, and an NFC module included in the strap of the wearable device 120 may include an NFC tag. The NFC tag may provide NFC tag information when it is tagged by an NFC reader.

The user terminal 110 may request, from a watch face providing server 130, information about a watch face that matches the strap based on the information obtained through NFC tagging. The watch face providing server 130 may provide information about the watch face to the user terminal 110. Here, the information about the watch face may include the image of the watch face and may also include setting information for setting the watch face on the wearable device 120.

Figure 4:
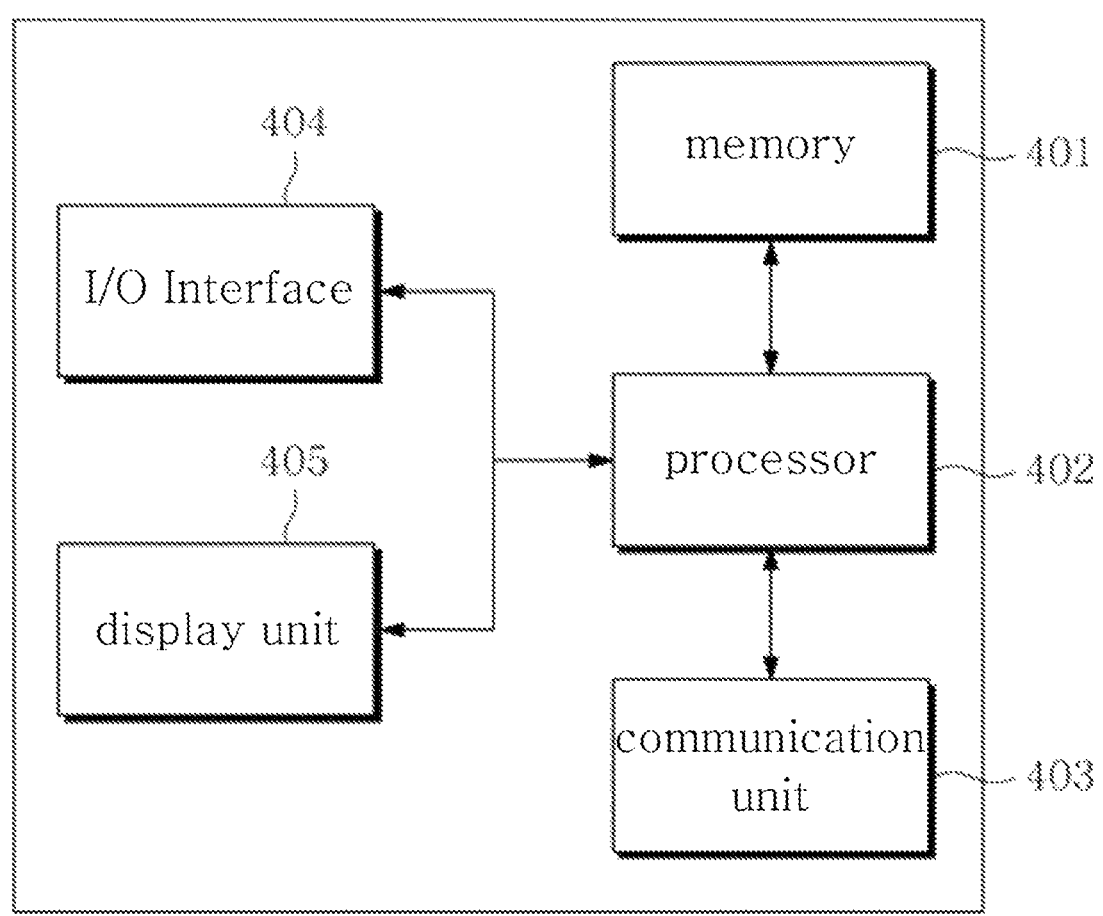
FIG. 4 illustrates a block diagram of a watch face providing server according to one or more examples of the present disclosure.

FIG. 4 illustrates a block diagram of a watch face providing server according to one or more examples of the present disclosure.

Terms used below, such as " . . . unit" and " . . . device", refer to units that perform at least one function or operation, and these units may be implemented through hardware, software, or a combination of hardware and software.

Referring to FIG. 4, a watch face providing server 130 may include a memory 401, a processor 402, a communication unit 403, an input/output interface 404, and a display unit 405.

The memory 401 may temporarily or permanently store data, such as essential programs, applications, setting information for the operation of the watch face providing server 130. The memory 401 may include a permanent mass storage device, such as Random Access Memory (RAM), Read Only Memory (ROM), and a disk drive, but it is not limited thereto. These software components may be loaded from a separate computer-readable storage medium and the memory 401 using a drive mechanism. Readable storage media in such separate computers may include computer-readable storage media such as a floppy drive, disk, tape, DVD/CD-ROM drive, memory card, etc. According to examples of the present disclosure, software components may also be loaded into the memory 401 via the communication unit 403, rather than computer-readable storage media. Additionally, the memory 401 may provide stored data in response to a request from the processor 402.

The processor 402 may control the overall operations of the watch face providing server 130. For example, the processor 402 may control the transmission and reception of signals via the communication unit 403. Additionally, the processor 402 may be configured to process instructions of computer programs by performing basic arithmetic, logic, and input-output operations. Instructions may be provided to the processor 402 by the memory 401 or the communication unit 403. For example, the processor 402 may be configured to execute received instructions according to program code stored in recording device, such as memory 401. For example, the processor 402 may control the watch face providing server 130 to perform the operations in accordance with various examples described later.

The Input/Output interface (hereinafter referred to as I/O interface) 404 may serve as a means for interfacing with Input/Output (I/O) devices (not shown). In this case, input devices may include devices such as a keyboard or a mouse, and output devices may be equipped in the form of devices such as a display unit for displaying images. The I/O interface 404 may also be a means for interfacing with devices that integrate both input and output functions into one, such as a touchscreen. Specifically, the processor 402 of the watch face providing server 130 may process instructions of computer programs loaded in the memory 401 using data provided by the server to enable a service screen or content to be displayed on the display via the I/O interface 404. According to an example of the present disclosure, the I/O interface 404 may include a means for interfacing with the display unit 405. The I/O interface 404 may receive user input for the web browsing window displayed on the display unit 405 and may receive output data to be displayed from the processor 402 via the display unit 405 in response to the user input.

The display unit 405 refers to a display module that includes one or more displays. Each of the one or more displays included in the display unit 405 may individually show independent content, and the mentioned one or more displays may also combine to display a single content. According to an example of the present disclosure, one or more displays included in the display unit 405 may include a plurality of physically separate displays, a plurality of physically combined displays, or a display that can be used by splitting a single screen.

Figure 5A:
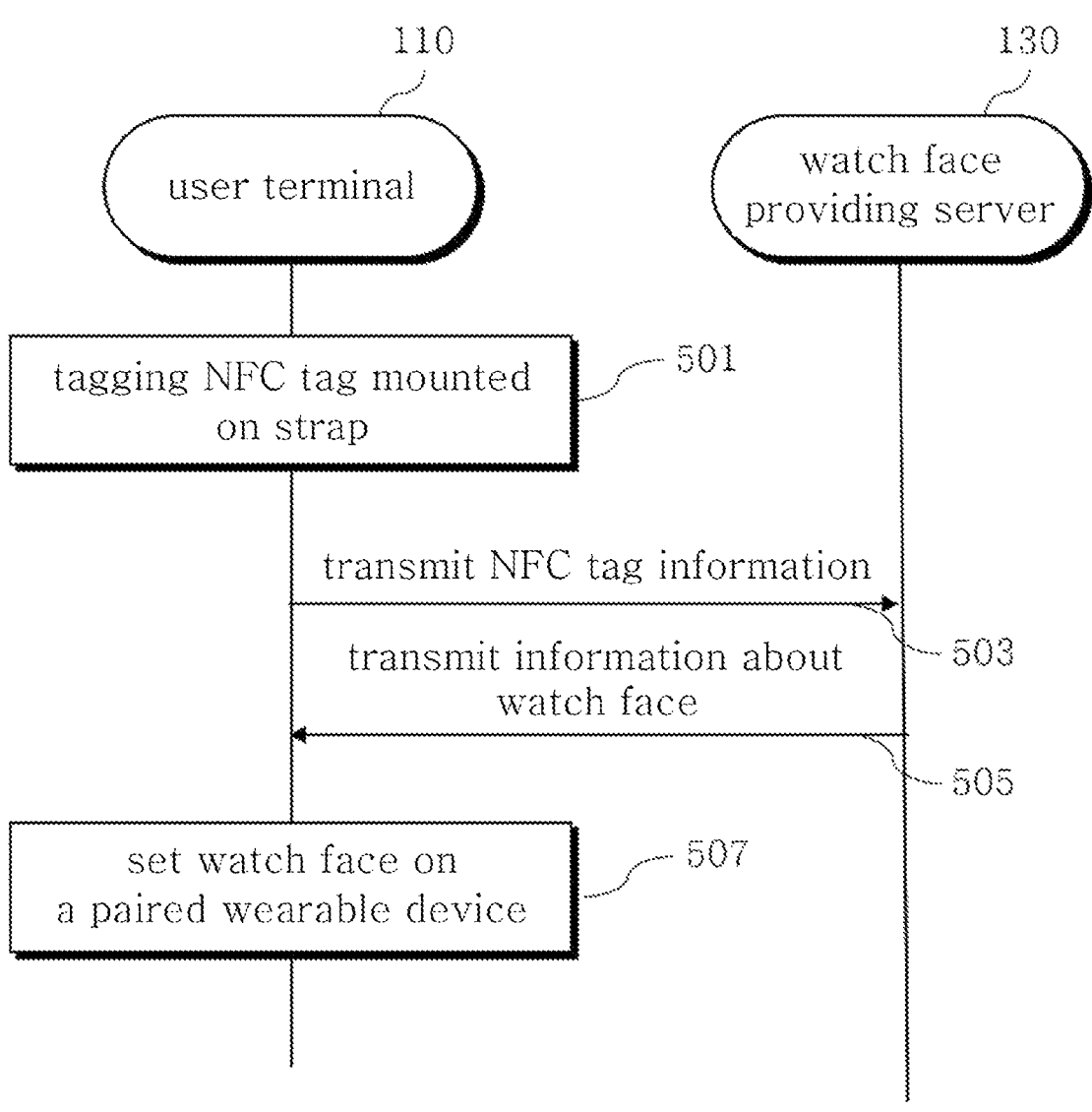
FIGS. 5A and 5B illustrate flowcharts showing a method for providing a watch face according to one or more examples of the present disclosure.
Figure 5B:
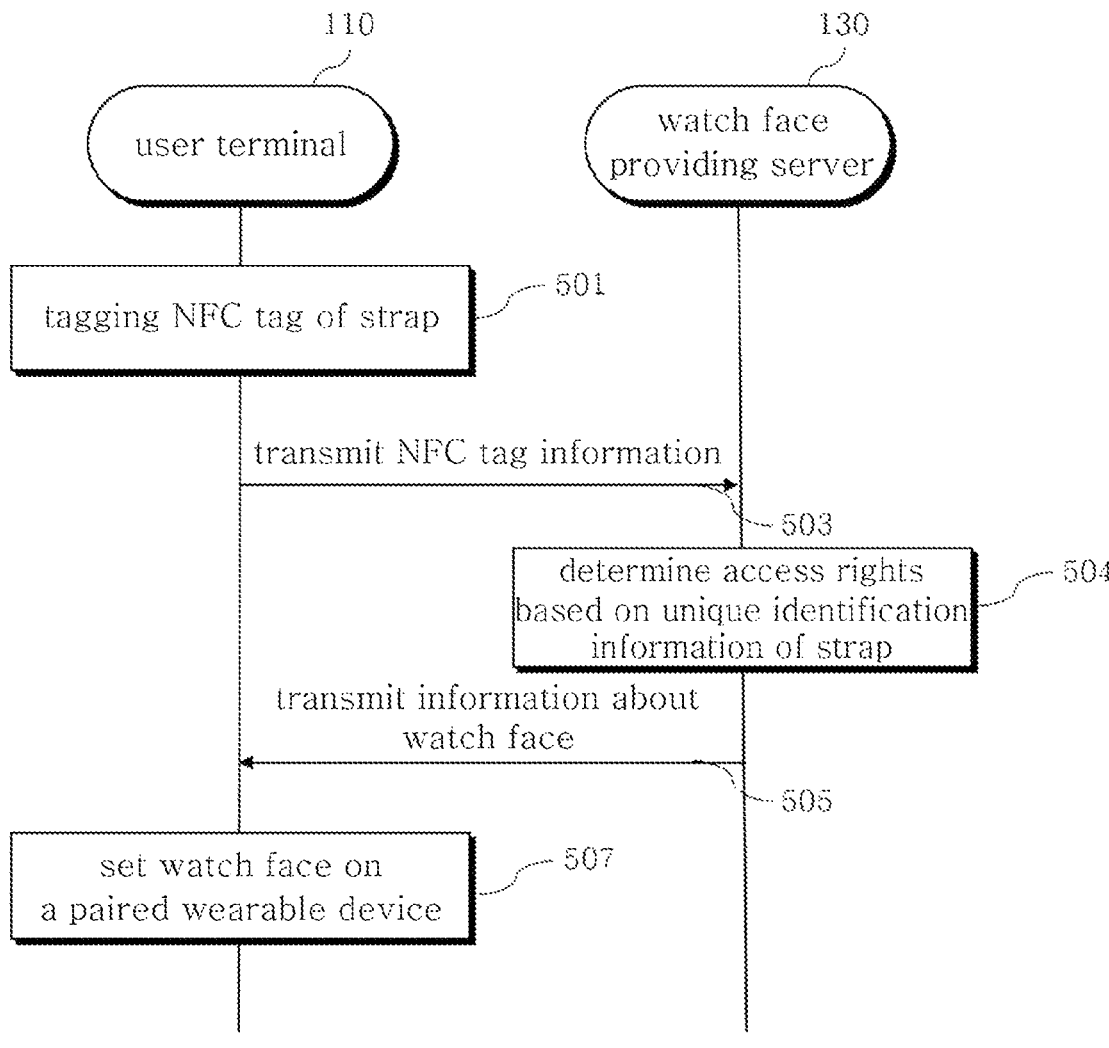

FIGS. 5A and 5B illustrate flowcharts showing a method for providing a watch face according to one or more examples of the present disclosure.

Referring to FIGS. 5A and 5B, in operation 501, a user terminal 110 may tag an NFC tag mounted on a strap using an NFC reader installed in the user terminal 110 and obtain NFC tag information through tagging. For example, NFC tag information may be represented as a message or an NFC Data Exchange Format (NDEF) message. Therein, the NDEF message may include at least one NDEF record, and the NDEF record may include header fields, type fields, ID fields, and payload fields, although the header, type, and ID fields may be omitted. At least one of the URL information and unique identification information of the strap obtained by the user terminal 110 through NFC tagging may be included in the NFC tag information. More specifically, they may be included in different payload fields within the NDEF message.

In operation 503, the user terminal 110 may transmit the NFC tag information obtained through tagging to the watch face providing server 130 to obtain a watch face matching the strap. For example, the user terminal 110 may access a website where it can obtain a watch face matching the strap based on the URL information included in the NFC tag information, and the watch face providing server 130 may provide information about the watch face matching the strap based on the URL information to the user terminal 110.

However, when the watch face providing server 130 obtains the unique identification information of the strap along with the URL information from the user terminal, it may perform subsequently an operation for determining access rights. In this case, operation 504, as shown in FIG. 5B, may be added.

In operation 504, the watch face providing server 130 may determine the user terminal's access rights based on the unique identification information included in the NFC tag information obtained from the user terminal 110. When the user terminal 110 has access rights, the watch face providing server 130 may activate a website where the user terminal can obtain the watch face matching the strap and provide it to the user terminal 110. When the user terminal 110 does not have access rights, the watch face providing server 130 may not activate a website where a watch face matching the strap can be obtained. In other words, when accessing a website to obtain the watch face with only the URL information, without the NFC tag information, the website will not be activated and therefore the watch face cannot be obtained.

For such operations, the watch face providing server 130 may in advance store information corresponding to the unique identification information included in the NFC tag information mounted on the strap in a database. The watch face providing server 130 may evaluate the access rights of the user terminal by comparing the pre-stored information with the unique identification information. A more detailed explanation will be provided later along with FIGS. 6A and 6B.

In operation 505, when the website becomes activated by the watch face providing server 130, the user terminal 110 may obtain a watch face from the website, and the watch face providing server 130 may transmit information about the watch face. Therein, the information about the watch face may include setting information that displays a watch face on a display of a wearable device that can be connected to a strap. In other words, the information about a watch face may include not only the image of the watch face but also the information necessary for displaying the watch face on the display of the wearable device.

In operation 507, based on the information obtained from the watch face providing server 130, the user terminal 110 may configure a watch face on the display of a paired wearable device. For example, the user terminal 110 may transmit information about the watch face to the paired wearable device, and the user may use the wearable device to set the watch face based on the information about the watch face. Alternatively, the user may also use the user terminal 110 to set the watch face on the paired wearable device based on the information about the watch face.

Figure 6A:
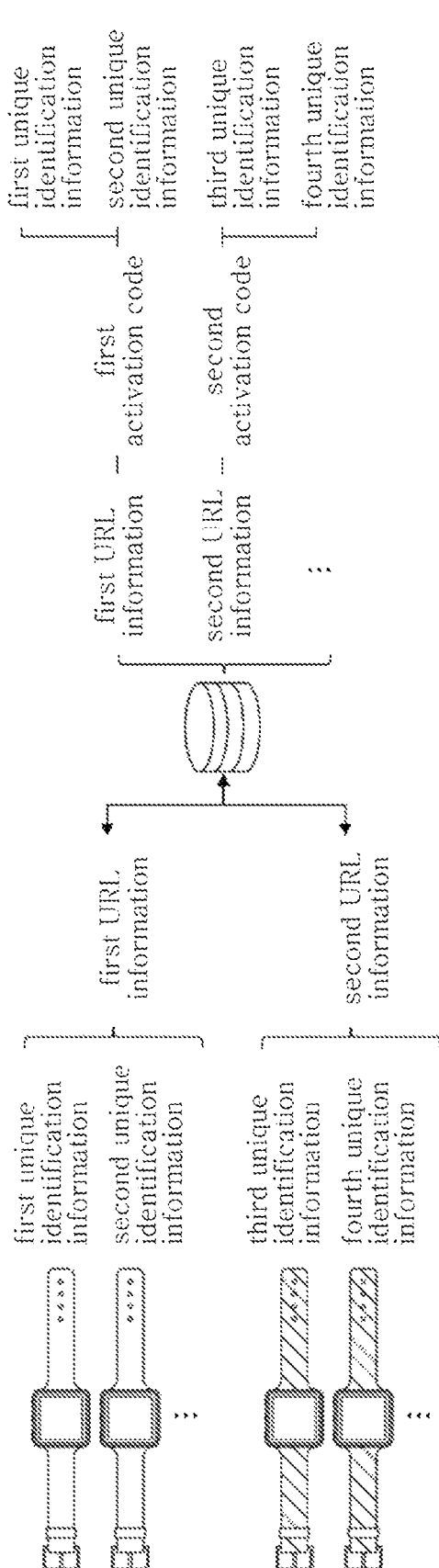
FIGS. 6A and 6B illustrate diagrams for describing the activation of a URL for providing a watch face according to one or more examples of the present disclosure.
Figure 6B:
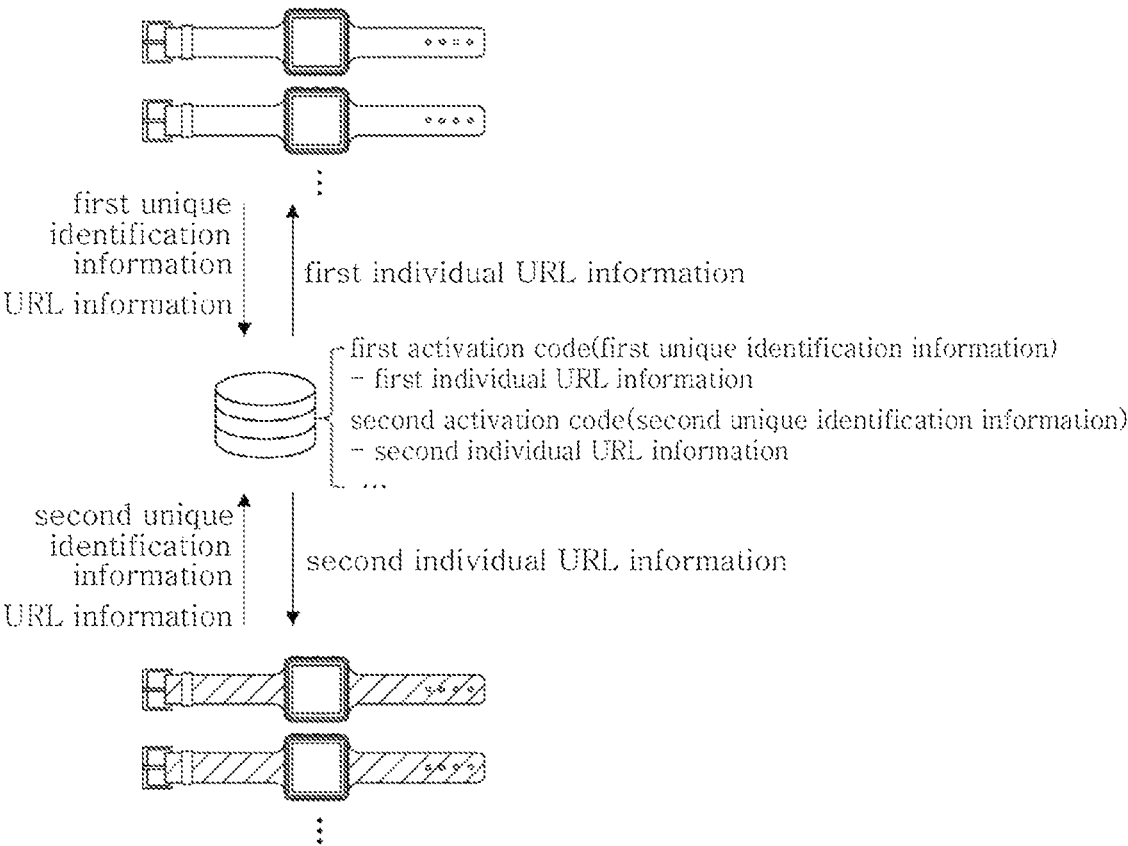

FIGS. 6A and 6B illustrate diagrams for describing activation of URL for providing a watch face according to one or more examples of the present disclosure.

According to an example, a watch face providing server 130 may activate a website corresponding to URL information based on the unique identification information. For this, the watch face providing server may obtain an activation code corresponding to the URL information from the server's database and may compare the activation code with the unique identification information. There are two ways to provide the watch face by activating the website, which will be discussed separately in more detail along with FIGS. 6A and 6B, but it is also possible to use both ways together.

Referring to FIG. 6A, unique identification information may be assigned for each strap, and URL information may be configured according to the type of strap. In other words, the NFC tags mounted on the straps may be given unique identification information about a corresponding strap, i.e., a corresponding tag. However, since the same watch face may be provided depending on the type of strap, URL information capable of providing a watch face may be given to the NFC tag for each type of strap.

The unique identification information may be extracted and stored in a database when coding an NFC tag mounted on a strap, or may be entered/set and stored in a database in advance. The watch face providing server 130 may evaluate the access rights of the user terminal by comparing the unique identification information via NFC tag mounted on the sold strap.

For example, when the watch face providing server 130 obtains URL information from the user terminal, it may request unique identification information as a password from a website based on the URL information. Additionally, when both URL information and unique identification information are obtained from the user terminal together, the unique identification information may be recognized as a password.

Afterwards, the watch face providing server 130 may obtain an activation code corresponding to the URL information from the database and may determine the activation of the website corresponding to the URL information by comparing unique identification information and the activation code. In other words, if the obtained unique identification information is included in the activation code, the website can be activated in response to the watch face request.

Referring to FIG. 6B, unique identification information may be assigned either for each strap or for each type of strap, and URL information may be set either based on strap types or uniformly for all.

When a watch face providing server 130 obtains unique identification information and URL information from a user terminal 110, it may compare the activation code and unique identification information stored in the database. For example, the watch face providing server 130 may determine the access rights of the user terminal by verifying the activation code corresponding to the unique identification information. Herein, the server may store a plurality of individual URL information. Each individual URL information may correspond to an activation code and may be information indicating a website where information about what faces corresponding to each unique identification information or activation code can be obtained.

In other words, the watch face providing server 130 may compare an activation code and unique identification information to determine one individual URL information corresponding to the unique identification information of the strap from among a plurality of individual URL information. This may be provided to the user terminal 110, and the user terminal 110 may access a website based on the obtained individual URL information to obtain information about a watch face. Herein, the access to a website based on individual URL information may also represent the activation of the website.

Figure 7:
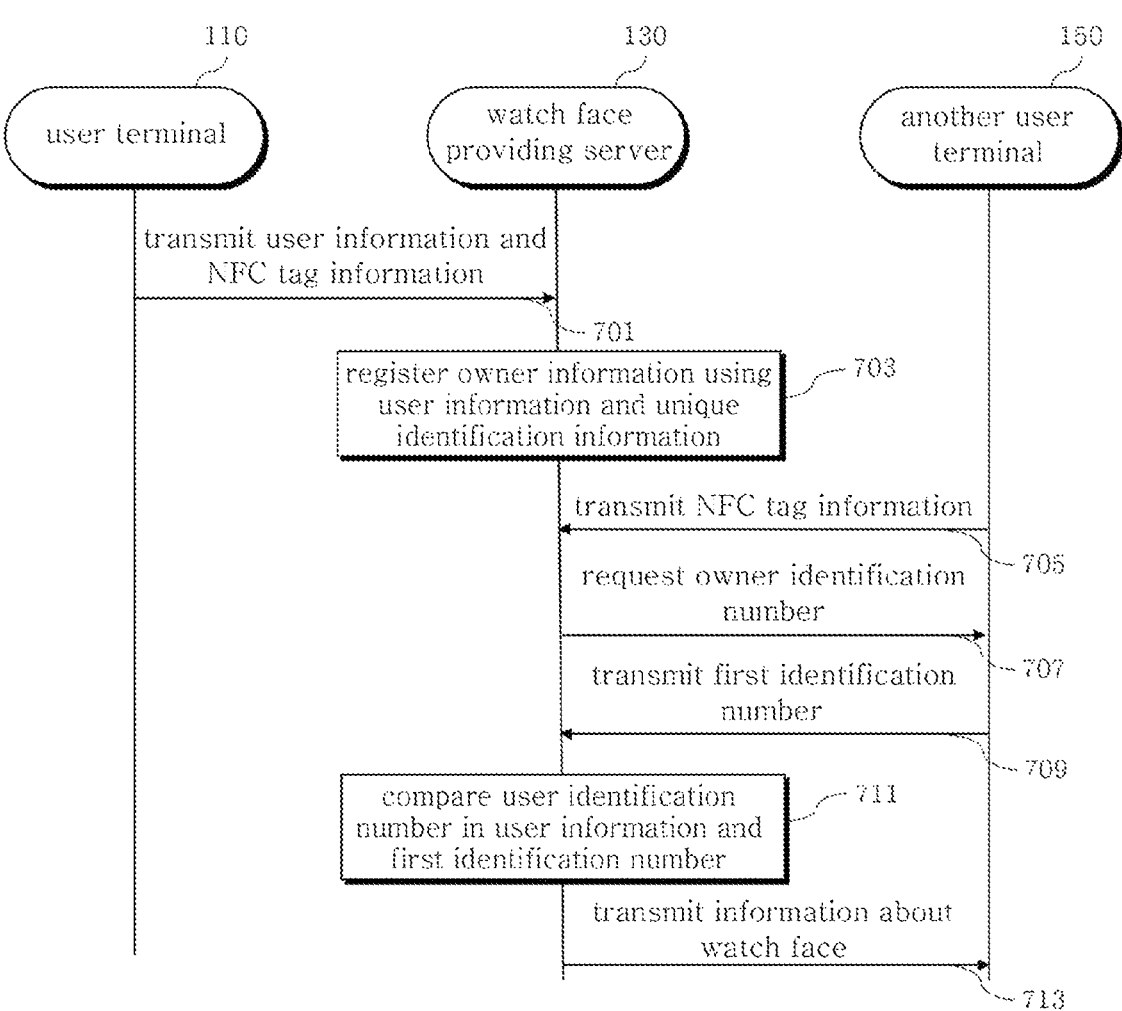
FIG. 7 illustrates a flowchart describing the operation when watch face re-request information is obtained according to one or more examples of the present disclosure.

FIG. 7 illustrates a flowchart for describing the operation when obtaining watch face re-request information according to one or more examples of the present disclosure.

The following explanation may apply when a user requests a watch face using NFC tag information after having received a watch face based on NFC tag information. This is a procedure designed to prevent a plurality of users from tagging to a single strap to receive watch faces, while also enabling the provision of watch faces again in cases where a true user requests a watch face using NFC tag information due to reasons such as changing or resetting the user terminal or wearable device.

Referring to FIG. 7, in operation 701, a user terminal 110 may transmit not only NFC tag information but also user information to a watch face providing server 130. The operation 701 may replace the previous operation 503, and user information may also be transmitted separately to the watch face providing server 130 after the transmission of NFC tag information. Here, user information may include a user identification number, which may be referred to as a Personal Identification Number (PIN) code. Additionally, the user information may include unique identification information, a password, etc., which may be omitted.

In operation 703, the watch face providing server 130 may register ownership information for the strap based on user information and unique identification information. In other words, the watch face providing server 130 may match the unique identification information of the strap included in the NFC tag information with the user identification number and register or store the strap's owner.

In operation 705, another user terminal 150 may tag the strap's NFC tag to obtain NFC tag information and transmit the NFC tag information to the watch face providing server 130. In other words, another user terminal 150 may request a watch face through NFC tagging.

In operation 707, the watch face providing server 130 may determine whether there is a history of providing a watch face based on the unique identification information included in the NFC tag information. To determine whether the requester is the owner of the strap, the server may request the owner's identification number from another user terminal 150. Additionally, in operation 709, another user terminal 150 may transmit a first identification number to the watch face providing server 130 in response to a request for the owner's identification number.

In operation 711, the watch face providing server 130 may compare the obtained first identification number with the user identification number included in the owner's information. Then, in operation 713, if the user identification number matches the first identification number, the watch face providing server 130 may determine another user terminal as the true owner who has previously been provided with a watch face and as a result activate the website corresponding to the URL information included in the NFC tag information, allowing for the provision of information about the watch face once again. However, if the first identification number and user identification number do not match, the watch face providing server may consider the other user terminal as not the true owner and may not activate the website corresponding to the URL information or provide information about the watch face.

Methods according to examples described in the claims or specification of the present disclosure may be implemented in the form of hardware, software, or a combination of hardware and software. The method according to the example may be implemented in the form of program instructions executable by various computer means and recorded on a computer-readable medium, and may be implemented as a computer program combined with hardware and stored in a computer-readable recording medium.

When implemented as software, a computer-readable storage medium may be provided that stores one or more programs (software modules). One or more programs stored in a computer-readable storage medium are configured to be executable (configured for execution) by one or more processors in an electronic device. One or more programs include instructions that cause the electronic device to perform methods according to examples described in the claims or specification of the present disclosure.

These programs (software modules, software) may be stored in random access memory, non-volatile memory, including flash memory, read only memory (ROM), electrically erasable programmable read only memory (EE-PROM), magnetic disk storage, compact disk ROM (CDROM), digital versatile disks (DVDs), other forms of optical storage, or a magnetic cassette. Alternatively, it may be stored in a memory consisting of a combination of some or all of the foregoing. In addition, a plurality of configuration memories may be included.

Furthermore, the program may also be stored on attachable storage devices accessible over a communications network, such as the Internet, Intranet, local area network (LAN), wide area network (WAN), or storage area network (SAN), or any combination of these networks. These storages may connect to devices that run the examples of the present disclosure through external ports. In addition, separate storages on the communications network may also connect to devices that execute the examples of the present disclosure.

In the specific embodiments of the present disclosure described above, the constituent elements included in the disclosure have been expressed as singular or plural based on the particular situations presented for ease of explanation. However, the use of singular or plural forms has been chosen to suit the context of the description, and the disclosure is not limited to singular or plural constituent elements. Even when elements are expressed in the plural form, they may be configured in the singular form, and when elements are expressed in the singular form, they may be configured in the plural form.

While specific examples have been described in the detailed description of the present disclosure, various modifications are of course possible without departing from the scope of the present disclosure. Therefore, the scope of the present disclosure should not be limited to the described examples, but should be determined not only by the scope of the patent claims described later, but also by the scope of this patent claim and equivalents.

What is claimed is:

1. A method for providing a watch face performed by at least one server, comprising:
   obtaining watch face request information from a user terminal based on uniform resource locator (URL) information corresponding to a strap; and
   providing information about a watch face matching the strap based on the URL information to the user terminal,
   wherein the URL information is obtained from a Near Field Communication (NFC) tag mounted on the strap via an NFC reader installed in the user terminal,
   wherein the information about a watch face includes setting information for representing the watch face on a display of a wearable device that is capable of being connected to the strap, and
   wherein the wearable device is paired in advance with the user terminal.

2. The method of claim 1, further comprising:
   obtaining unique identification information of the strap from the user terminal,
   wherein the unique identification information is obtained from the NFC tag mounted on the strap via the NFC reader installed in the user terminal,
   wherein the providing information about a watch face matching the strap based on the URL information to the user terminal comprises:

activating a website corresponding to the URL information based on the unique identification information, wherein the user terminal obtains information about a watch face that matches the strap via the website.

3. The method of claim 2, wherein the URL information and the unique identification information are included in different payload fields within tag information obtained from the NFC tag.

4. The method of claim 2, wherein the activating a website corresponding to the URL information based on the unique identification information comprises:

obtaining an activation code corresponding to the URL information from a database of the server; and activating a website corresponding to the URL information based on the activation code and the unique identification information.

5. The method of claim 4, wherein the activating a website corresponding to the URL information based on the activation code and the identification information comprises:

determining one of a plurality of individual URL information by comparing the activation code and the unique identification information; and providing the determined one URL information to the user terminal, wherein the website is provided based on the individual URL information.

6. The method of claim 2, further comprising:

obtaining user information including a user identification number from the user terminal;

registering owner information about the strap based on the user information and the unique identification information;

obtaining, after the information about a watch face is provided to the user terminal, when the watch face request information is obtained again from another user terminal, the owner information based on the identification information;

obtaining a first identification number from the another user terminal; and activating a website corresponding to the URL information based on the first identification number and the user identification number.

7. An electronic device performing a method for providing a watch face, comprising:

at least one processor; and a memory for storing at least one command executed by the at least one processor, wherein the at least one command is executed to obtain watch face request information based on URL information corresponding to a strap from a user terminal and to provide information about the watch face matching the strap based on the URL information to the user terminal, wherein the URL information is obtained from an NFC tag mounted on the strap through an NFC reader installed in the user terminal, wherein the information about the watch face includes setting information representing the watch face on a display of a wearable device connectable to the strap, and wherein the wearable device is paired in advance with the user terminal.

8. The electronic device of claim 7, wherein the at least one command is executed to obtain unique identification information of the strap from the user terminal, wherein the unique identification information is obtained from the NFC tag mounted on the strap through the NFC reader installed in the user terminal, wherein the at least one command is executed to activate a website corresponding to the URL information based on the unique identification information, wherein the user terminal obtains information about the watch face matching the strap through the website.

9. The electronic device of claim 8, wherein the URL information and the unique information are included in different payload fields within tag information obtained from the NFC tag.

10. The electronic device of claim 8, wherein the at least one command is executed to obtain an activation code corresponding to the URL information from the database of the electronic device, wherein the activation code and the unique identification information are used to activate the website corresponding to the URL information.

11. The electronic device of claim 10, wherein the at least one command is executed to compare the activation code and the unique identification information to determine one of a plurality of individual URL information, wherein the determined individual URL information is provided to the user terminal, and the website is provided based on the individual URL information.

12. The electronic device of claim 8, wherein the at least one command is executed to:

obtain user information, including a user identification number, from the user terminal;

register owner information for the strap based on the user information and the unique identification information;

obtain the owner information after information about the watch face has been provided to the user terminal, if the watch face request information is obtained again from another user terminal;

obtain a first identification number from the another user terminal; and activate a website corresponding to the URL information based on the first identification number and the user identification number.

* * * * *